United States Patent
Takezawa et al.

(10) Patent No.: US 8,586,233 B2
(45) Date of Patent: Nov. 19, 2013

(54) PORTABLE ELECTRONIC DEVICE

(75) Inventors: Hideharu Takezawa, Nara (JP);
Tomohiko Yokoyama, Osaka (JP);
Kazuya Iwamoto, Osaka (JP); Taisuke Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 338 days.

(21) Appl. No.: 12/933,769

(22) PCT Filed: Sep. 18, 2009

(86) PCT No.: PCT/JP2009/004754
§ 371 (c)(1),
(2), (4) Date: Sep. 21, 2010

(87) PCT Pub. No.: WO2010/032486
PCT Pub. Date: Mar. 25, 2010

(65) Prior Publication Data
US 2011/0020688 A1    Jan. 27, 2011

(30) Foreign Application Priority Data

Sep. 22, 2008 (JP) ................................. 2008-242150

(51) Int. Cl.
*H01M 2/02*    (2006.01)
*H01M 2/10*    (2006.01)
*H01M 10/50*   (2006.01)
*H01M 2/00*    (2006.01)
*H01M 2/08*    (2006.01)

(52) U.S. Cl.
USPC ............. 429/177; 429/96; 429/120; 429/163; 429/175

(58) Field of Classification Search
USPC ............................ 429/177, 175, 120, 96, 163
See application file for complete search history.

(56) References Cited

U.S. PATENT DOCUMENTS

| 5,618,640 | A  | * | 4/1997  | Idota et al. ................. 429/218.1 |
| 6,146,783 | A  |   | 11/2000 | Brohm et al. |
| 6,262,889 | B1 |   | 7/2001  | Newman et al. |
| 7,749,648 | B2 | * | 7/2010  | Kim .............................. 429/175 |
| 7,749,650 | B1 | * | 7/2010  | Hermann ....................... 429/177 |
| 2008/0241680 | A1 | | 10/2008 | Lee et al. |
| 2010/0072952 | A1 | | 3/2010  | Nakajima |

FOREIGN PATENT DOCUMENTS

| EP | 1 168 468 A1 | 1/2002 |
| JP | 04-162347   | 6/1992 |
| JP | 05-234573   | 9/1993 |
| JP | 09-082293   | 3/1997 |

(Continued)

OTHER PUBLICATIONS

Chinese Office Action issued in Chinese Patent Application No. 200980114177.1 mailed on Dec. 27, 2012.

*Primary Examiner* — Patrick Ryan
*Assistant Examiner* — Julian Anthony
(74) *Attorney, Agent, or Firm* — McDermott Will & Emery LLP

(57) ABSTRACT

Provided is a highly safe portable electronic device having a secondary battery as a power source, and including a package, an electronic device body housed in the package, and a battery housing portion housed in the package, in which even if the content melts due to an extremely significant impact applied thereto, discharge of a melt is inhibited. In the portable electronic device, the battery housing portion is a molding with a battery fitting portion for fitting the secondary battery therein, and the battery fitting portion has a covering layer, which includes a temperature suppression layer and a block layer, provided on its surface.

16 Claims, 4 Drawing Sheets

(56) References Cited

FOREIGN PATENT DOCUMENTS

| | | |
|---|---|---|
| JP | 10-306208 | 11/1998 |
| JP | 2001-306187 | 11/2001 |
| JP | 2003-031187 | 1/2003 |
| JP | 2003-346754 | 12/2003 |
| JP | 2004-228047 | 8/2004 |
| JP | 2004-259613 | 9/2004 |
| JP | 2008-192342 | 8/2008 |
| KR | 10-0716596 B1 | 5/2007 |
| WO | WO 01/45185 A1 | 6/2001 |
| WO | WO 2008/062879 A1 | 5/2008 |
| WO | WO-2008/078948 A1 | 7/2008 |

\* cited by examiner

PORTABLE ELECTRONIC DEVICE

RELATED APPLICATIONS

This application is the U.S. National Phase under 35 U.S.C. §371 of International Application No. PCT/JP2009/004754, filed on Sep. 18, 2009, which in turn claims the benefit of Japanese Application No. 2008-242150, filed on Sep. 22, 2008, the disclosures of which Applications are incorporated by reference herein.

TECHNICAL FIELD

The present invention relates to portable electronic devices. More specifically, the present invention relates to improvements to package structures for housing secondary batteries as power sources.

BACKGROUND ART

For portable electronic devices, such as cell phones, personal digital assistants, notebook computers, camcorders, and handheld game machines, advanced functionality results in an increased number of heat-generating components mounted on a board. In use of the portable electronic device, heat dissipation from heat-generating components might cause the package surface to be locally heated to high temperature.

Patent Document 1 discloses a structure in which heat from heat-generating components housed in the package of a portable electronic device is advantageously diffused by a heat-conducting member with superior heat dissipation performance which is arranged around the heat-generating components. Examples of the heat-conducting member include metallic materials such as aluminum alloy, magnesium alloy, stainless steel, and plain steel.

Patent Document 2 discloses a flame-retardant resin composition which includes aromatic polycarbonate having a phosphorous flame retardant added thereto and is used as a material for packages and components of electronic devices.

Patent Document 3 discloses a resin composition including a heat-absorbing material such as aluminum hydroxide or magnesium hydroxide. Aluminum hydroxide and magnesium hydroxide reduce combustion heat through an endothermic reaction. The endothermic reaction is a reaction in which water is released. The endothermic reaction exerts a flame retardant effect.

Patent Document 4 discloses a battery pack including an exterior case, batteries housed in the exterior case, and a heat-insulating layer formed between the inner surface of the exterior case and the batteries. Patent Document 4 also discloses that such a heat-insulating layer prevents reduction in battery performance due to lowered environmental temperature.

Patent Document 1: International Publication WO2008/062879 pamphlet
Patent Document 2: Specification of Japanese Patent No. 3682148
Patent Document 3: Specification of Japanese Patent No. 3408676
Patent Document 4: Japanese Laid-Open Patent Publication. No. Hei 5-234573

Currently, among secondary batteries widely used as power sources of portable electronic devices, lithium ion secondary batteries are mainly used in which the positive electrode includes lithium cobalt oxide and the negative electrode includes graphite. It is assumed that if such a lithium ion secondary battery is subjected to an extremely significant impact, gas or flame goes out of the battery.

On the other hand, to achieve higher-capacity and higher-energy density lithium ion secondary batteries, attempts have been made to use silicon- or tin-based active materials as negative electrode active materials. In particular, the silicon-based active material has an extremely high capacity compared to graphite. It is assumed that if a lithium ion secondary battery using a silicon-based active material is subjected to an extremely significant impact, an alkali salt such as lithium orthosilicate melts to become a high-temperature liquid, which flows out of the battery.

DISCLOSURE OF THE INVENTION

Problem to be Solved by the Invention

An object of the present invention is to provide a highly safe and reliable portable electronic device having a high-capacity and high-energy density secondary battery as a power source.

Means for Solving the Problem

The present invention is directed to a portable electronic device having a secondary battery as a power source, comprising a package, an electronic device body, a battery housing portion, and a covering layer.

The electronic device body is housed in the package. The battery housing portion is a molding housed in the package, which has a battery fitting portion with a predetermined shape for fitting the secondary battery therein.

The covering layer is provided on a surface of the battery housing portion on the side of which the secondary battery is fitted, and the covering layer includes a temperature suppression layer for inhibiting a surface temperature rise of the portable electronic device and a block layer for inhibiting discharge of the content from the secondary battery in an overheated state.

Effect of the Invention

According to the portable electronic device of the present invention, even if the content of the secondary battery melts due to an extremely significant impact applied thereto, it is possible to prevent discharge of a high-temperature melt from the portable electronic device while inhibiting a surface temperature rise of the portable electronic device.

While the novel features of the invention are set forth particularly in the appended claims, the invention, both as to organization and content, will be better understood and appreciated, along with other objects and features thereof, from the following detailed description taken in conjunction with the drawings.

BEST MODE FOR CARRYING OUT THE INVENTION

First Embodiment

Figure 1:
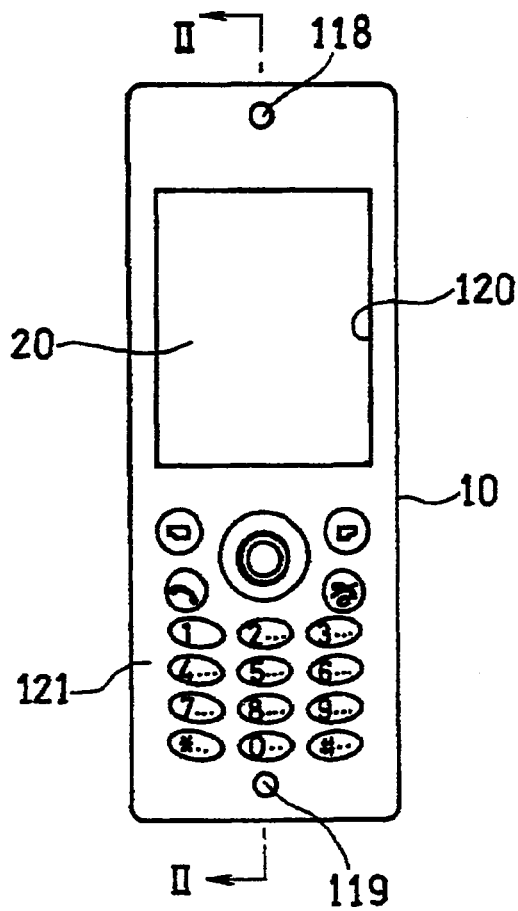
FIG. 1 is a top view schematically illustrating the appearance of a cell phone, which is a portable electronic device according to a first embodiment.
Figure 2:
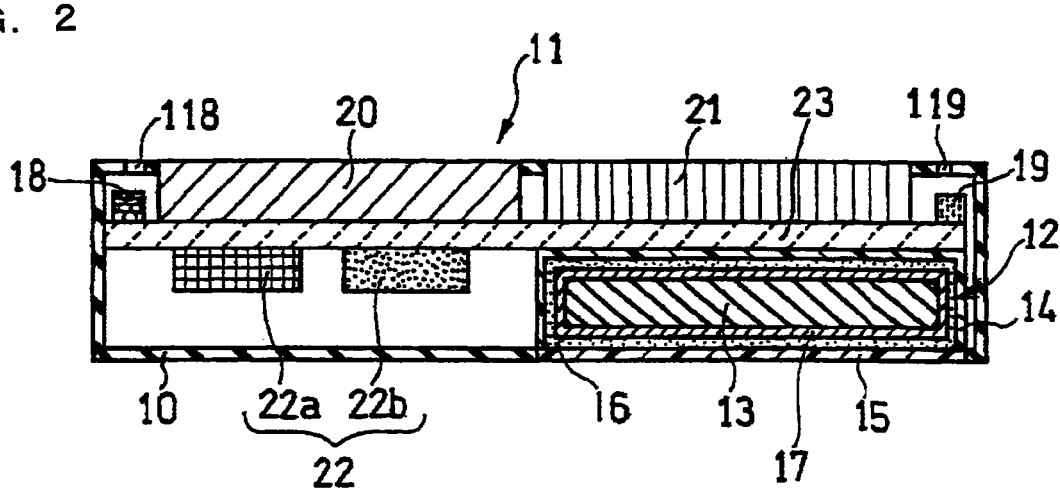
FIG. 2 is a cross-sectional view taken from line II-II of the cell phone shown in FIG. 1.
Figure 3:
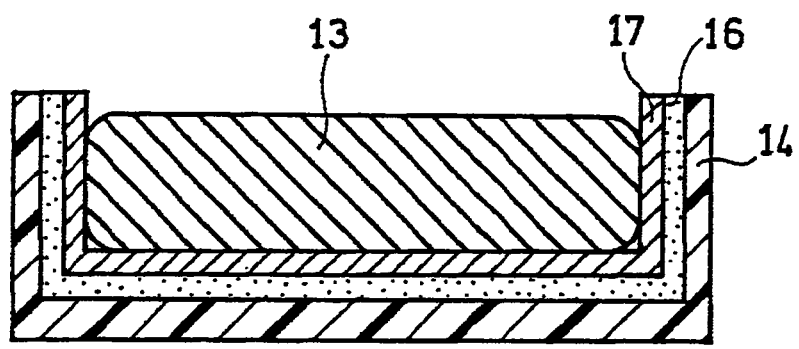
FIG. 3 is a longitudinal sectional view schematically illustrating in cross section the shape of a battery housing portion having a secondary battery housed therein.
Figure 4:
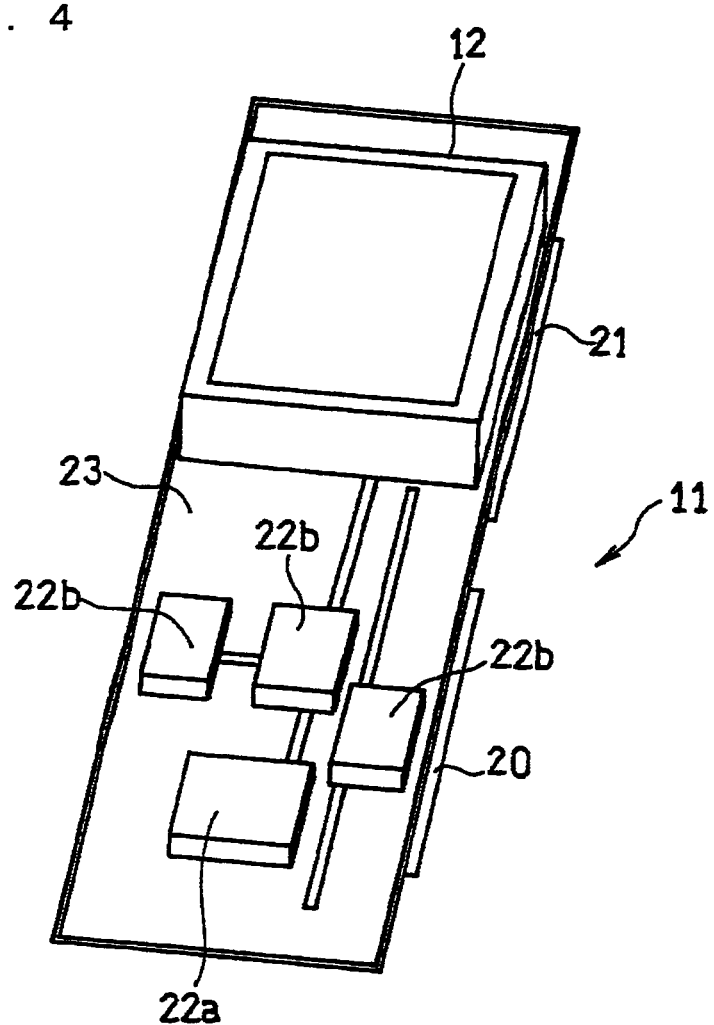
FIG. 4 is a perspective view schematically illustrating an electronic device body.
Figure 5:
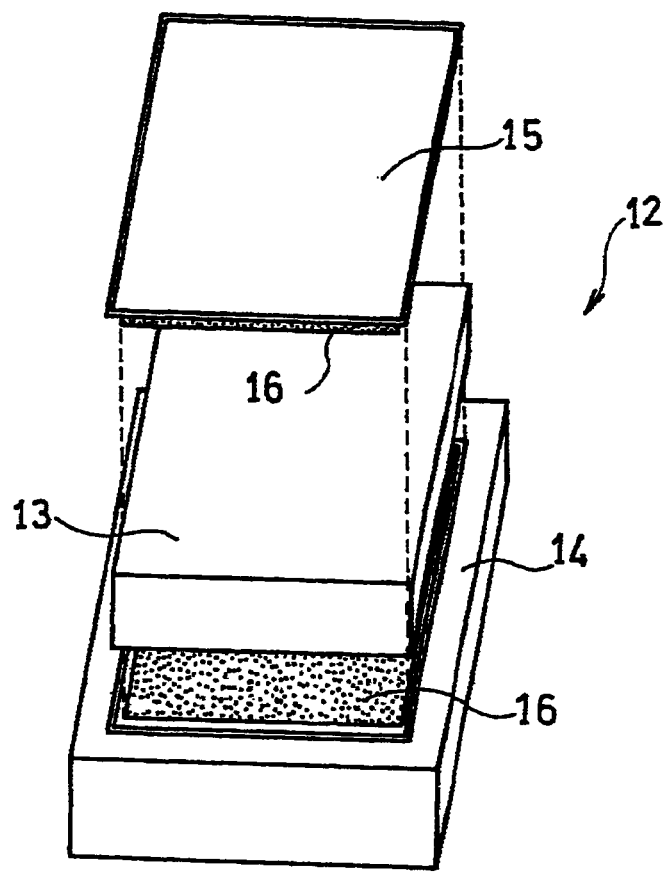
FIG. 5 is a perspective view schematically illustrating the battery housing portion.

FIG. 1 is a top view schematically illustrating the appearance of a cell phone 1, which is a portable electronic device in a first embodiment of the present invention. FIG. 2 is a cross-sectional view taken from line II-II of the cell phone 1 shown in FIG. 1. FIG. 3 is a longitudinal sectional view schematically illustrating in cross section the shape of a battery housing portion 12 having a secondary battery 13 housed therein. FIG. 4 is a perspective view of an electronic device body 11 with the battery housing portion 12. FIG. 5 is a perspective view of the battery housing portion 12, illustrating the secondary battery 13 being housed.

First, the configuration of the cell phone 1 will be described.

The cell phone 1 includes a package 10, the electronic device body 11 housed in the package 10, the battery housing portion 12, and the secondary battery 13 housed in the battery housing portion 12, as shown in FIGS. 1 and 2. The electronic device body 11 includes a speaker 18, a microphone 19, an image display portion 20, an input operation portion 21, a circuit portion 22, and a circuit board 23.

The speaker 18, the microphone 19, the image display portion 20, the input operation portion 21, and the circuit portion 22 are mounted on the circuit board 23 having predetermined circuitry formed thereon. The battery housing portion 12 includes positive and negative terminals by which the battery housing portion 12 is mounted at a predetermined position on the circuitry of the circuit board.

As shown in FIG. 2, the speaker 18 is disposed so as to face an earpiece hole 118 provided at a predetermined position in the package 10. Also, the microphone 19 is disposed so as to face a mouthpiece hole 119 provided at a predetermined position in the package 10. The image display portion 20 is disposed and fitted in a display hole 120 provided in the package 10 so that display can be recognized from outside.

The input operation portion 21 is disposed and fitted in an input portion 121 which is a face including a combination of input buttons provided in the package 10 such that the operator can input information. Note that the circuit board 23 may have a card connector and/or a small camera device additionally mounted on its surface as necessary.

The speaker 18 emits an incoming call notification sound and also outputs incoming speech. Outgoing speech is inputted via the microphone 19. The image display portion 20 displays images, characters, graphics, or video. As the image display portion 20, a liquid crystal monitor or suchlike can be used. The input operation portion 21 receives operations inputted through the input portion 121. In the case where the image display portion 20 is a touch panel, the image display portion 20 doubles as the input operation portion 21.

The circuit portion 22 includes a circuit control portion 22*a* and a storage portion 22*b*. The circuit control portion 22*a* executes various operational controls in accordance with input information provided by the operator via the input operation portion 21. The storage portion 22*b* stores, for example, the input information provided by the operator. As the circuit control portion 22*a*, a plurality of IC chips or a central processing unit (CPU) is used. As the storage portion 22*b*, memory such as RAM or ROM is used.

The electronic device body 11 is driven by power supplied by the secondary battery 13.

The operator performs input operation via the input operation portion 21 to transmit a command signal to the circuit control portion 22*a*. Then, the transmitted command signal triggers a predetermined operation. Also, the input information is stored to the storage portion 22*b* as necessary.

In addition, the operator speaks into the microphone 19. The produced speech is converted into a radio signal by a circuit inside the circuit portion 22, which is transmitted to another receiver. Furthermore, a radio signal outputted by another receiver is received by an antenna circuit. The received radio signal is converted into a speech signal by a circuit inside the circuit portion 22, which is outputted by the speaker 18.

Next, the package 10 included in the cell phone 1 will be described. The package 10 has housed therein the electronic device body 11 and the battery housing portion 12. The package 10 is made from, for example, a metallic material or a resin material.

Next, the battery housing portion 12 included in the cell phone 1 will be described in detail.

The battery housing portion 12 includes a battery fitting portion 14 for fitting the secondary battery 13 therein and a lid portion 15 for covering the secondary battery 13 fitted in the battery fitting portion 14, as shown in FIG. 2.

The battery fitting portion 14 is a recessed member having an internal space corresponding to the shape of the secondary battery 13. An opening of the recess is disposed so as to be directed outward from the package 10 in order to allow battery replacement. The battery fitting portion 14 is provided with a positive terminal portion (not shown) which is brought into contact with the positive terminal (not shown) of the secondary battery 13 to be fitted and a negative terminal portion (not shown) which is brought into contact with the negative terminal (not shown) of the secondary battery 13.

The lid portion 15 is a member detachably provided to the battery fitting portion 14 of the package 10. The lid portion 15 is attached so as to cover the secondary battery 13 fitted in the recessed portion, thereby occupying the opening of the recessed portion. The secondary battery 13 is supported by the recessed portion having the secondary battery 13 fitted therein.

As the secondary battery 13 to be housed in the battery housing portion 12, high-capacity and high-energy density lithium ion secondary batteries, which are conventionally used in portable electronic devices and can be reduced in size, can be preferably used.

Among the lithium ion secondary batteries, those including a silicon- or tin-based active material as a negative electrode active material are preferable, and those including a lithium-containing composite metal oxide as a positive electrode active material and a silicon- or tin-based active material as a negative electrode active material are particularly preferable. The silicon- and tin-based active materials can achieve higher capacity and energy density for the lithium ion secondary battery.

The silicon-based active material is not limited to any specific material so long as it is a silicon-containing active material, but silicon, silicon oxide, silicon alloy or the like is preferable. The tin-based active material is not limited to any specific material so long as it is a tin-containing active material, but tin, tin oxide, tin alloy or the like is preferable. Among them, the silicon-based active material is particularly preferable.

Note that the secondary battery 13 may be an unit cell or may be in the form of a battery pack including unit cells combined in series or parallel.

The battery fitting portion 14 and the lid portion 15 are preferably made from a resin material or a metallic material. Preferably used as the resin material is a flame-retardant resin composition which includes a matrix resin, such as polycarbonate, polypropylene or polyethylene terephthalate, having a flame retardant added thereto. The flame-retardant resin composition preferably has a flame-retardant rating of V-0 or higher in the UL-94 burn test. Preferably used as the metallic material without limitation is, for example, stainless steel, magnesium alloy, or aluminum alloy.

Furthermore, as shown in FIGS. 2 and 3, a temperature suppression layer 16 for inhibiting a surface temperature rise of the portable electronic device 1 is provided on a surface of the battery fitting portion 14 that faces the secondary battery 13 (hereinafter, also referred to as a "battery fitting-side surface") and on a surface of the lid portion 15 that faces the secondary battery 13 (hereinafter, a "facing-side surface"), and a block layer 17 for inhibiting discharge of the content of the secondary battery 13 in overheated state is provided on a surface of the temperature suppression layer 16. In this manner, the temperature suppression layer 16 and the block layer 17 are sequentially formed on the surface of the battery housing portion 12 on the side of which the secondary battery 13 is housed.

In such a configuration, the secondary battery 13 housed in the battery housing portion 12 is surrounded by the block layer 17 which is in turn surrounded by the temperature suppression layer 16. By forming the block layer 17 inside the temperature suppression layer 16, the temperature suppression layer 16 is prevented from being in direct contact with a high-temperature melt of alkali salt flowing out from the secondary battery 13 in an overheated state due to an extremely significant impact being applied thereto. Thus, it is possible to inhibit functional loss of the temperature suppression layer 16 due to contact with a melt of alkali salt.

As a result, a melt of alkali salt leaking from the secondary battery 13 can be reliably prevented from flowing outside the cell phone 1. Also, it is possible to inhibit heat generated by the secondary battery 13 from being locally conducted to the surface of the package 10. Thus, the surface of the package 10 can be inhibited from being locally heated to high temperature. Moreover, the package 10 can be inhibited from being damaged by heat.

Accordingly, to sufficiently exert the effect of the temperature suppression layer 16, the block layer 17 is preferably formed inside the temperature suppression layer 16.

The temperature suppression layer 16 has a thickness of preferably from 500 to 3000 μm, more preferably from 800 to 1500 μm. When the temperature suppression layer 16 is excessively thin, the temperature suppression layer 16 has insufficient thermal insulating properties. As a result, the surface of the cell phone 1 might be locally heated to high temperature or the battery fitting portion 14 and the lid portion 15 might be deformed. Also, when the temperature suppression layer 16 is excessively thick, the battery housing portion 12 becomes excessively thick, which reduces the degree of freedom in design for size reduction of the cell phone 1.

The temperature suppression layer 16 has a thermal conductivity of preferably 0.2 W/m·K or lower, more preferably 0.05 W/m·K or lower. When the thermal conductivity of the temperature suppression layer 16 is excessively high, thermal insulating properties of the temperature suppression layer 16 become insufficient, so that the surface of the package 10 might be locally heated to high temperature when the secondary battery 13 generates heat. As a result, the battery fitting portion 14 and the lid portion 15 might be deformed.

Such a temperature suppression layer 16 is formed in a manner as described below.

The temperature suppression layer 16 is obtained by, for example, forming a coating film through application of a temperature suppression layer formation composition, which includes thermally insulating inorganic compound particles and a binding agent, to the surface on which to form the temperature suppression layer 16.

An example of the thermally insulating inorganic compound particle is an inorganic compound particle that induces endothermic reaction (hereinafter, simply referred to as an "endothermic inorganic compound particle"). The endothermic inorganic compound particle is preferably an inorganic compound particle having an endothermic peak at a temperature of 80° C. or higher. In the case of the heat-insulating layer including such endothermic inorganic compound particles, when the secondary battery generates heat, the endothermic inorganic compound particles absorb heat by endothermic reaction. As a result, it is possible to inhibit the surface of the package 10 from being locally heated to high temperature when the secondary battery generates heat.

Examples of the endothermic inorganic compound particle include inorganic hydrates, metal hydroxides and carbonates that have a peak exhibiting a high amount of heat absorption at a temperature of 80° C. or higher, preferably an endothermic peak at a temperature of 80° C. or higher. Specific examples include calcium sulfate dihydrate ($CaSO_4.2H_2O$), sodium hydrogen carbonate ($NaHCO_3$), aluminum hydroxide ($Al(OH)_3$), magnesium hydroxide ($Mg(OH)_2$), and calcium carbonate ($CaCO_3$). They may be used alone or two or more of them may be used in combination. Among them, calcium sulfate dihydrate ($CaSO_4.2H_2O$) is preferable in view of its particularly superior endothermic properties.

Calcium sulfate hemihydrate ($CaSO_4.0.5H_2O$, calcined gypsum) exhibits binding properties when mixed with water and turns into calcium sulfate dihydrate to be cured when dried after application. Calcium sulfate hemihydrate is particularly preferable because it can be used as both the endothermic inorganic compound particle and a binding agent to be described later.

The temperature range in which the endothermic inorganic compound particle exhibits endothermic reaction is from 80 to 150° C. for calcium sulfate dihydrate, from 100 to 230° C. for sodium hydrogen carbonate, from 230 to 350° C. for aluminum hydroxide, from 350 to 450° C. for magnesium hydroxide, and from 690 to 850° C. for calcium carbonate. Accordingly, a suitable combination of these may sustain continuous endothermic reaction.

The size of the endothermic inorganic compound particle is not specifically limited but is preferably from 500 to 3000 μm. If the size of the endothermic inorganic compound particle is within this range, the binding agent has enhanced properties in binding the endothermic inorganic compound particles in the temperature suppression layer 16. As a result, the temperature suppression layer 16 is inhibited from, for example, locally flaking or cracking, so that the effect of the temperature suppression layer 16 can persist for a long period of time.

As the binding agent, any resin material or inorganic compound can be used without limitation so long as the endothermic inorganic compound particles can be sufficiently bound. Specific examples thereof include, for example, polyvinylidene chloride (PVDC), polyvilylidene fluoride (PVDF), and tetrafluoroethylene (PTFE). Also, as the inorganic compound, calcium sulfate hemihydrate which turns into calcium sulfate dihydrate when mixed with water and cured is particularly preferable in that it combines the function of the binding agent with the function of the endothermic inorganic compound particle.

When the endothermic inorganic compound particles are used in combination with the binding agent, the endothermic inorganic compound particles absorb heat, so that melting of the binding agent can be inhibited. Therefore, even if the secondary battery 13 generates heat, for example, due to an extremely significant impact applied thereto, the secondary battery 13 can be prevented from being exposed to the outside of the cell phone 1.

On the other hand, when no endothermic inorganic compound particles are included, heat absorption is achieved by taking advantage of, for example, latent heat of a melted binding agent, which, however, fails to inhibit melting of the binding agent. As a result, the binding agent melts, developing liquidity and simultaneously exhibiting volume contraction of the binding agent, so that the heated secondary battery 13 is exposed to the outside of the cell phone 1.

The content of endothermic inorganic compound particles in the temperature suppression layer 16 is preferably 30 to 95% by mass, more preferably 50 to 90% by mass. When the content of endothermic inorganic compound particles is excessively low, the temperature suppression layer 16 tends to have insufficient thermal insulating properties, and when it is excessively high, the temperature suppression layer 16 tends to be susceptible to flaking or tends to have reduced strength.

Also, the content of binding agent in the temperature suppression layer 16 is preferably 5 to 70% by mass, more preferably 5 to 50% by mass.

The temperature suppression layer formation composition can be prepared by dissolving or dispersing inorganic compound particles that have thermal insulating properties and a binding agent in an organic solvent or water. Then, the temperature suppression layer 16 is obtained as a coating film formed by applying the temperature suppression layer formation composition thus prepared to the battery fitting-side surface of the battery fitting portion 14 and the facing-side surface of the lid portion 15.

For application of the temperature suppression layer formation composition, any conventionally known application methods can be employed without limitation, including methods such as immersion application, roller application, spray application, and doctor blade application. After application, the coating film that is to serve as the temperature suppression layer 16 is formed by, for example, removing the solvent by drying.

The block layer 17 is made from a metallic material resistant to a melt of alkali salt. Among all alkali salt melts, the metallic material is preferably resistant to a melt of lithium orthosilicate at a liquid temperature of 1450° C. The "resistant" as used herein is intended to mean that 50 μm-thick metallic foil made of a metallic material is not caused to melt by contact with a melt of lithium orthosilicate at a liquid temperature of 1450° C. More preferably, the "resistant" here is intended to mean 50 μm-thick metallic foil made of a metallic material is not caused to melt to become perforated by contact with a melt of lithium orthosilicate at a liquid temperature of 1450° C.

A specific example of such a metallic material is at least one metal or metal nitride selected from the group consisting of iron, vanadium, niobium, molybdenum, tantalum, tungsten, titanium nitride, and stainless steel.

The metallic material for forming the block layer 17 was selected by the following test method.

Five grams of lithium orthosilicate ($Li_4SiO_4$, manufactured by CERAC) was placed in a platinum crucible and caused to melt by heating to 1450° C. in the atmosphere within an electric furnace. Tablets made of materials shown in Table 1 below were added to the resultant melt and heated for one minute. Thereafter, mixtures of the melt and the tablets were drained into stainless steel vats and cooled to solidification. The resultant solids were carefully broken to take out the tablets and examine the degree of melting by measuring the diameter, thickness, and weight of the tablets. The results are shown in Table 1.

TABLE 1

| Melt Material | Melt Point (° C.) | Before Test | | | After Test | | | Difference (pre-test value − post-test value) | | |
|---|---|---|---|---|---|---|---|---|---|---|
| | | Diameter (mm) | Thickness (mm) | Weight (g) | Diameter (mm) | Thickness (mm) | Weight (g) | Diameter (mm) | Thickness (mm) | Weight (g) |
| Fe | 1536 | 10.006 | 4.958 | 3.029 | 10.464 | 5.126 | 3.003 | −0.485 | −0.168 | 0.026 |
| Ti | 1668 | 10.173 | 5.065 | 1.808 | 10.159 | 5.227 | 1.792 | 0.014 | −0.162 | 0.016 |
| $SiO_2$ | 1730 | 10.011 | 5.020 | 0.867 | 8.494 | 4.667 | 0.495 | 1.517 | 0.356 | 0.372 |
| $TiO_2$ | 1840 | 10.009 | 5.371 | 1.547 | Completely Melted | | | — | — | — |
| Zr | 1852 | 10.002 | 5.111 | 2.609 | 10.151 | 5.432 | 2.623 | −0.149 | −0.321 | −0.014 |
| V | 1900 | 9.987 | 3.217 | 1.464 | 10.093 | 3.428 | 1.455 | −0.106 | −0.211 | 0.009 |
| Nb | 2468 | 10.143 | 5.152 | 3.479 | 10.196 | 5.483 | 3.447 | −0.053 | −0.331 | 0.032 |
| Mo | 2610 | 9.928 | 5.060 | 3.980 | 10.146 | 5.095 | 3.931 | −0.218 | −0.035 | 0.049 |
| $ZrO_2$ | 2720 | 10.017 | 4.986 | 0.946 | 10.059 | 4.995 | 0.933 | −0.042 | −0.009 | 0.013 |
| MgO | 2830 | 10.004 | 5.086 | 1.363 | 10.249 | 5.197 | 1.245 | −0.245 | −0.111 | 0.118 |
| Ta | 2996 | 10.008 | 5.143 | 6.694 | 10.281 | 5.452 | 6.627 | −0.273 | −0.309 | 0.067 |
| TiN | 3290 | 10.005 | 5.124 | 1.969 | 10.027 | 5.141 | 1.950 | −0.022 | −0.017 | 0.019 |
| W | 3387 | 9.994 | 5.167 | 7.732 | 10.017 | 5.274 | 7.638 | −0.023 | −0.107 | 0.094 |
| TaC | 3980 | 10.272 | 5.018 | 3.273 | Fractured | | | — | — | — |

The tablet made of $TiO_2$ was not found in the solid, and therefore it is conceivable that it melted completely. The tablet made of TiC fractured as soon as it was placed in the electric furnace set at 1450° C., so that its shape was not maintained. The tablet made of $SiO_2$ was apparently reduced in diameter, thickness, and weight, suggesting that it reacted with lithium orthosilicate.

The tablets made of materials other than $TiO_2$, TiC, and $SiO_2$ were increased in diameter and thickness compared to pre-test values. Such changes were conceivably made by expansion of air in the tablets. In addition, they were not significantly reduced in weight after the test, and therefore Fe, Ti, Zr, V, Nb, Mo, $ZrO_2$, MgO, Ta, W, and TiN were determined by the primary selection to be highly resistant to the melt of alkali salt.

Among the materials that passed the primary selection, metallic foil (50 μm thick) made of Fe, Ti, Zr, V, Nb, Mo, Ta, W, and TiN that can be processed into metallic foil were subjected to a subsequent test. Furthermore, metallic foil (50 μm thick) made of stainless steel was also subjected to the same test.

Metallic foil was welded to make containers (hereinafter, referred to as "cups") in the form of cubes 20 mm on a side. Seven grams of lithium orthosilicate was placed in a platinum crucible and caused to melt by heating to 1450° C. in the atmosphere within an electric furnace. The resultant melt was introduced into cups in the atmosphere. After cooling, the appearance of the cups was observed to examine the presence or absence of any holes and discharge of any molten material. The results are shown in Table 2.

TABLE 2

| Material | Presence or absence of holes | Discharge of molten material |
| --- | --- | --- |
| Fe | Absent | Not Discharged |
| Ti | Dissolved at the bottom | Discharged |
| Zr | Dissolved at the bottom | Discharged |
| V | Absent | Not Discharged |
| Nb | Absent | Not Discharged |
| Mo | Absent | Not Discharged |
| Ta | Absent | Not Discharged |
| W | Absent | Not Discharged |
| TiN | Absent | Not Discharged |
| Stainless Steel | Absent | Not Discharged |

The cups made of Ti and Zr were dissolved at the bottom, resulting in a large hole, and a melt of lithium orthosilicate was observed to flow out from the hole. As for other cups, neither holes nor discharge of molten material was observed.

From the above results, it can be appreciated that the metallic materials other than Ti and Zr, i.e., Fe, V, Nb, Mo, Ta, W, TiN, and stainless steel, are highly resistant to the melt of alkali salt.

Although the thickness of the block layer 17 is not specifically limited, it is preferably 20 μm or more, more preferably 30 μm to 100 μm. When the block layer 17 is excessively thin, the block layer 17 might have a hole made by contact with a melt of alkali salt. Also, when the block layer 17 is excessively thick, the degree of freedom in design for size reduction of the cell phone 1 might be reduced.

To form the block layer 17, a molding made of a metallic material resistant to a melt of alkali salt is laid on the surface of the temperature suppression layer 16. Also, the block layer 17 may be formed not only by simply laying the molding but also by bonding the molding onto the surface of the temperature suppression layer 16. Furthermore, instead of bonding, the molding may be fixed by catches previously provided on the battery fitting-side surface of the battery fitting portion 14 for fixing the molding. Such a catch is provided so as to project from the surface of the temperature suppression layer 16.

Examples of the molding include foil or plates made of a metallic material resistant to a melt of alkali salt and moldings obtained by drawing or welding such a metallic material resistant to a melt of alkali salt.

Note that in the present embodiment, the temperature suppression layer 16 and the block layer 17 are provided on both the battery fitting-side surface of the battery fitting portion 14 and the facing-side surface of the lid portion 15 but the temperature suppression layer 16 and the block layer 17 may be provided on only one of them.

Second Embodiment

Next, a cell phone of a second embodiment will be described. The cell phone of the second embodiment is configured in the same manner as the cell phone 1 of the first embodiment except that the temperature suppression layer is structured differently. To avoid overlapping descriptions, descriptions other than detailed descriptions of the temperature suppression layer structure will be omitted.

Figure 6:
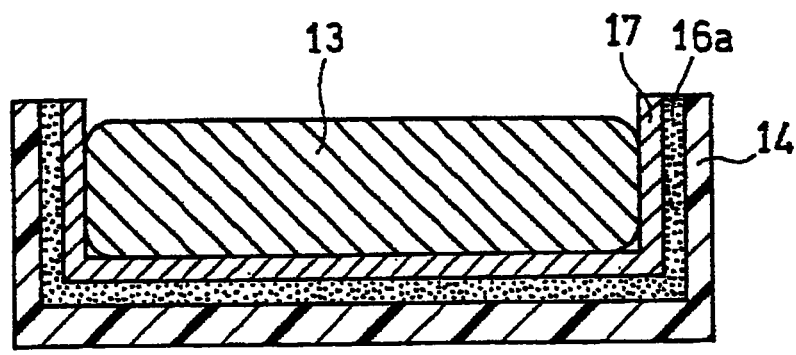
FIG. 6 is a longitudinal sectional view schematically illustrating the configuration of a substantial part of a cell phone battery housing portion in a second embodiment.

FIG. 6 is a longitudinal sectional view schematically illustrating the configuration of a substantial part of a cell phone battery housing portion in the second embodiment. The cell phone of the second embodiment has a temperature suppression layer 16a to be described below formed in the battery housing portion, in place of the temperature suppression layer 16 formed in the battery housing portion 12 of the cell phone 1 in the first embodiment.

As in the case of the temperature suppression layer 16, the thickness of the temperature suppression layer 16a is preferably from 500 to 3000 μm, more preferably from 800 to 1500 μm. The thermal conductivity of the temperature suppression layer 16a is preferably 0.2 W/m·K or lower, more preferably 0.05 W/m·K or lower.

The temperature suppression layer 16a is formed by laminating an inorganic fiber sheet on the battery fitting-side surface of the battery fitting portion 14 and the facing-side surface of the lid portion 15.

As the inorganic fiber sheet, a conventionally known, thermally insulating fiber sheet made of, for example, inorganic fiber-woven or nonwoven cloth or paper is used without limitation. Examples of such an inorganic fiber sheet include, for example, inorganic fiber sheets made from glass wool or rock wool. Such inorganic fiber sheets may be used alone or two or more of them may be used in combination.

The thermal conductivity of the inorganic fiber sheet is preferably 0.1 W/m·K or lower, more preferably 0.05 W/m·K or lower. When the thermal conductivity of the inorganic fiber sheet is excessively high, thermal insulating properties tend to be insufficient. Note that, for example, the thermal conductivity of glass wool is approximately 0.045 W/m·K.

The thickness of the inorganic fiber sheet is not specifically limited. Concretely, it is preferably in the range from, for example, 500 to 3000 μm. Also, the weight per unit area of the inorganic fiber sheet is preferably 30 to 1000 mg/cm$^2$.

The temperature suppression layer 16a can be formed by bonding the inorganic fiber sheet to the battery fitting-side surface of the battery fitting portion 14 and the facing-side surface of the lid portion 15. Also, instead of bonding, the inorganic fiber sheet may be fixed by catches previously provided on both the battery fitting-side surface of the battery fitting portion 14 and the facing-side surface of the lid portion 15 for fixing the inorganic fiber sheet.

Next, another cell phone of the second embodiment will be described. The cell phone of the present embodiment is configured in the same manner as the cell phone 1 of the first embodiment except that the temperature suppression layer is structured differently. To avoid overlapping descriptions, descriptions other than detailed descriptions of the temperature suppression layer structure will be omitted.

Figure 7:
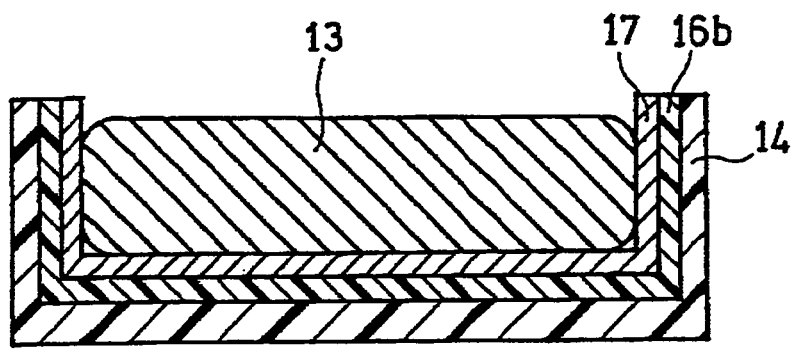
FIG. 7 is a longitudinal sectional view schematically illustrating the configuration of a substantial part of another cell phone battery housing portion in the second embodiment.

FIG. 7 is a longitudinal sectional view schematically illustrating the configuration of a substantial part of the other cell phone battery housing portion in the second embodiment. The cell phone of the present embodiment has a temperature suppression layer 16b to be described below formed in the battery housing portion 12, in place of the temperature suppression layer 16 formed in the battery housing portion 12 of the cell phone 1 in the first embodiment. The temperature suppression layer 16b is preferably similar to the temperature suppression layers 16 and 16a in terms of thickness and thermal conductivity.

The temperature suppression layer 16b is formed by laminating a porous resin sheet on the battery fitting-side surface of the battery fitting portion 14 and the facing-side surface of the lid portion 15.

Specific examples of the porous resin sheet include conventionally known materials, e.g., foam sheets such as urethane foam and styrene foam; vacuum insulation materials; and expandable insulation materials.

The vacuum insulation material is an insulation material having a porously structured core coated with a laminate film and sealed under reduced internal pressure. For example, urethane foam, glass wool, and silica powder can be used for the core.

The expandable insulation material is a resin insulation material including ingredients that expand instantly when exposed to high temperature, thereby forming a porous body. A specific example of the expandable insulation material is, for example, Fiblock (trade name, manufactured by Sekisui Chemical Co., Ltd.).

The thermal conductivity of the porous resin sheet is preferably 0.1 W/m·K or lower, more preferably 0.05 W/m·K or lower. When the thermal conductivity of the porous resin sheet is excessively high, thermal insulating properties tend to be insufficient.

The thickness of the porous resin sheet is not specifically limited. Concretely, it is preferably in the range from, for example, 500 to 3000 μm. Also, preferably, the weight per unit area of the porous resin sheet is preferably 10 to 500 mg/cm$^2$.

The temperature suppression layer 16b can be formed by bonding the porous resin sheet to the battery fitting-side surface of the battery housing portion 12 and the facing-side surface of the lid portion 15. Also, instead of bonding, the porous resin sheet may be fixed by catches previously provided on both the battery fitting-side surface of the battery fitting portion 14 and the facing-side surface of the lid portion 15 for fixing the porous resin sheet.

Note that in the present embodiment, the temperature suppression layer 16a or 16b and the block layer 17 are provided on both the battery fitting-side surface of the battery fitting portion 14 and the facing-side surface of the lid portion 15 but the temperature suppression layer 16a or 16b and the block layer 17 may be provided on only one of them.

Third Embodiment

Next, a cell phone of a third embodiment will be described. The cell phone of the third embodiment is configured in the same manner as the cell phone 1 of the first embodiment except that the temperature suppression layer is structured differently. To avoid overlapping descriptions, descriptions other than detailed descriptions of the temperature suppression layer structure will be omitted.

Figure 8:
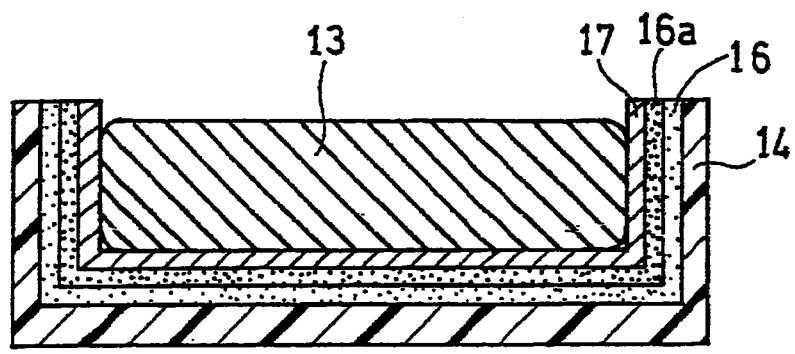
FIG. 8 is a longitudinal sectional view schematically illustrating the configuration of a substantial part of a cell phone battery housing portion in a third embodiment.

FIG. 8 is a longitudinal sectional view schematically illustrating the configuration of a substantial part of a cell phone battery housing portion in the third embodiment. The cell phone of the third embodiment has temperature suppression layers 16 and 16a formed in the battery housing portion, as described below, in place of the temperature suppression layer 16 formed in the battery housing portion 12 of the cell phone 1 in the first embodiment.

In the present embodiment, the temperature suppression layer 16 is provided on both the battery fitting-side surface of the battery fitting portion 14 and the facing-side surface of the lid portion 15, the temperature suppression layer 16a is provided on the surface of the temperature suppression layer 16, and the block layer 17 is provided on the surface of the temperature suppression layer 16a. The temperature suppression layer 16 is a heat absorption layer including endothermic inorganic compound particles, and the temperature suppression layer 16a is a heat-insulating layer made of an inorganic fiber sheet. Such a configuration results in a further enhanced heat-insulating effect and further suppression of the temperature rise on the cell phone surface.

The first through third embodiments have been described with respect to the cell phone with a battery housing portion having a battery fitting portion and a lid portion, but this is not restrictive. The configuration of the present invention is applicable to, for example, cell phones having a battery housing portion detachably provided to the cell phone package and cell phones incorporating secondary batteries.

While the portable electronic device of the present invention has been described in detail by way of exemplary cell phones of the first to third embodiments, the present invention is naturally applicable to portable electronic devices other than the cell phones. Specifically, the present invention can be applicable to, for example, portable electronic devices such as: PDAs; game machines; digital still cameras (DSCs); portable music devices; and notebook computers and portable camcorders respectively having as their power sources, battery packs including a combination of secondary batteries. Moreover, the technical features of the present invention are also applicable to exterior materials for large secondary batteries for use as power sources of electric vehicles, for example.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The portable electronic device of the present invention is advantageous in that, if by any chance a secondary battery generates heat and its content melts, an abrupt surface temperature rise and discharge of a melt from the portable electronic device are inhibited, and it can be used in the same applications as conventional portable electronic devices.

Also, a covering layer, including a temperature suppression layer and a block layer, in the portable electronic device of the present invention is applicable to exterior materials for enhancing the safety of large-sized secondary batteries for use as drive sources of electric vehicles or suchlike.

The invention claimed is:

1. A portable electronic device having a secondary battery as a power source, comprising:
a package, an electronic device body housed in the package, a battery housing portion being a molding housed in the package, which has a battery fitting portion with a predetermined shape for fitting the secondary battery therein, and a covering layer provided on a surface of the battery housing portion on the side of which the secondary battery is fitted, wherein:
the secondary battery is a lithium ion secondary battery which includes a silicon-based active material as a negative electrode active material,
the covering layer includes a temperature suppression layer for inhibiting a surface temperature rise of the portable electronic device and a block layer for inhibiting discharge of the content from the secondary battery in an overheated state,
the block layer is made of a metallic material resistant to a melt of alkali salt including silicon, and
when the metallic material is in the form of a 50 μm-thick metallic foil, the foil is resistant to melting by contact with a melt of lithium orthosilicate at a liquid temperature of 1450° C.

2. The portable electronic device according to claim 1, wherein the covering layer includes the temperature suppression layer provided on the surface of the battery housing portion on the side of which the secondary battery is fitted and the block layer provided on a surface of the temperature suppression layer.

3. The portable electronic device according to claim 1, wherein the metallic material comprises at least one metal or metal nitride selected from the group consisting of Fe, V, Nb, Mo, Ta, W, TiN, and stainless steel.

4. The portable electronic device according claim 1, wherein the temperature suppression layer has a thickness of from 500 to 3000 μm and a thermal conductivity of 0.2 W/m·K or lower.

5. The portable electronic device according to claim 4, wherein the temperature suppression layer comprises an inorganic fiber sheet having a thermal conductivity of 0.1 W/m·K or lower.

6. The portable electronic device according to claim 5, wherein the inorganic fiber sheet is a sheet including at least one inorganic fiber selected from glass wool and rock wool.

7. The portable electronic device according to claim 4, wherein the temperature suppression layer includes a porous resin sheet having a thermal conductivity of 0.1 W/m·K or lower.

8. The portable electronic device according to claim 4, wherein the temperature suppression layer is a layer including 30 to 95% by mass of endothermic inorganic compound particles and 5 to 70% by mass of binding agent, the endothermic inorganic compound particle having an endothermic peak at a temperature of 80° C. or higher.

9. The portable electronic device according to claim 8, wherein the endothermic inorganic compound particles include particles of at least one compound selected from the group consisting of inorganic hydrate, metal hydroxide and carbonate.

10. The portable electronic device according to claim 8, wherein the endothermic inorganic compound particles include particles of at least one compound selected from the group consisting of calcium sulfate dihydrate, sodium hydrogen carbonate, aluminum hydroxide, magnesium hydroxide and calcium carbonate.

11. The portable electronic device according to claim 1, wherein the secondary battery is in the form of a battery pack including a combination of unit cells.

12. A portable electronic device having a secondary battery as a power source, comprising:
a package, an electronic device body housed in the package, a battery housing portion being a molding housed in the package, which has a battery fitting portion with a predetermined shape for fitting the secondary battery therein, and a covering layer provided on a surface of the battery housing portion on the side of which the secondary battery is fitted, wherein:
the covering layer includes a temperature suppression layer for inhibiting a surface temperature rise of the portable electronic device and a block layer for inhibiting discharge of the content from the secondary battery in an overheated state,
the temperature suppression layer has a thickness of from 500 to 3000 μm and a thermal conductivity of 0.2 W/m·K or lower, and
the temperature suppression layer comprises an inorganic fiber sheet having a thermal conductivity of 0.1 W/m·K or lower.

13. The portable electronic device according to claim 12, wherein the inorganic fiber sheet is a sheet including at least one inorganic fiber selected from glass wool and rock wool.

14. A portable electronic device having a secondary battery as a power source, comprising:
a package, an electronic device body housed in the package, a battery housing portion being a molding housed in the package, which has a battery fitting portion with a predetermined shape for fitting the secondary battery therein, and a covering layer provided on a surface of the battery housing portion on the side of which the secondary battery is fitted, wherein:
the covering layer includes a temperature suppression layer for inhibiting a surface temperature rise of the portable electronic device and a block layer for inhibiting discharge of the content from the secondary battery in an overheated state,
the temperature suppression layer has a thickness of from 500 to 3000 μm and a thermal conductivity of 0.2 W/m·K or lower, and
the temperature suppression layer is a layer including 30 to 95% by mass of endothermic inorganic compound particles and 5 to 70% by mass of binding agent, the endothermic inorganic compound particle having an endothermic peak at a temperature of 80° C. or higher.

15. The portable electronic device according to claim 14, wherein the endothermic inorganic compound particles include particles of at least one compound selected from the group consisting of inorganic hydrate, metal hydroxide and carbonate.

16. The portable electronic device according to claim 14, wherein the endothermic inorganic compound particles include particles of at least one compound selected from the group consisting of calcium sulfate dihydrate, sodium hydrogen carbonate, aluminum hydroxide, magnesium hydroxide and calcium carbonate.

* * * * *